United States Patent
Harkins

(10) Patent No.: US 9,550,421 B2
(45) Date of Patent: Jan. 24, 2017

(54) DC-TO-DC CONVERTER WITH VARIABLE SET-POINT CONTROL

(71) Applicants: DENSO International America, Inc., Southfield, MI (US); DENSO CORPORATION, Kariya, Aichi-pref. (JP)

(72) Inventor: James Harkins, Canton, MI (US)

(73) Assignees: Denso International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 493 days.

(21) Appl. No.: 14/215,133

(22) Filed: Mar. 17, 2014

(65) Prior Publication Data

US 2015/0258947 A1  Sep. 17, 2015

(51) Int. Cl.
| | | |
|---|---|---|
| *B60L 1/06* | (2006.01) | |
| *B60L 1/00* | (2006.01) | |
| *B60L 1/14* | (2006.01) | |
| *B60L 3/00* | (2006.01) | |
| *B60L 3/12* | (2006.01) | |
| *B60L 11/18* | (2006.01) | |

(52) U.S. Cl.
CPC ............... *B60L 1/06* (2013.01); *B60L 1/003* (2013.01); *B60L 1/14* (2013.01); *B60L 3/003* (2013.01); *B60L 3/12* (2013.01); *B60L 11/1805* (2013.01); *B60L 11/1868* (2013.01); *B60L 2210/10* (2013.01); *B60L 2240/34* (2013.01); *B60L 2240/525* (2013.01); *B60L 2240/527* (2013.01); *B60L 2240/529* (2013.01); *B60L 2240/622* (2013.01); *B60L 2250/16* (2013.01); *Y02T 10/7005* (2013.01); *Y02T 10/7066* (2013.01); *Y02T 10/7216* (2013.01); *Y02T 10/7291* (2013.01); *Y02T 90/16* (2013.01); *Y02T 90/162* (2013.01)

(58) Field of Classification Search
CPC .......................................................... B60L 1/06
USPC .................................................. 307/10.1, 9.1
See application file for complete search history.

(56) References Cited

U.S. PATENT DOCUMENTS

| | | | | |
|---|---|---|---|---|
| 6,166,934 A | * | 12/2000 | Kajouke | B60L 1/00 363/65 |
| 7,923,866 B2 | * | 4/2011 | Ichikawa | B60L 3/0046 307/10.1 |
| 8,598,734 B2 | * | 12/2013 | Kusumi | B60L 11/123 307/10.1 |

(Continued)

FOREIGN PATENT DOCUMENTS

| | | |
|---|---|---|
| EP | 1 023 767 | 8/2000 |
| EP | 1 608 066 | 12/2005 |

(Continued)

*Primary Examiner* — Joseph Chang
(74) *Attorney, Agent, or Firm* — Harness, Dickey & Pierce, P.L.C.

(57) ABSTRACT

A DC-to-DC converter may be disposed in a vehicle for converting a high voltage from a power source to a low voltage. The DC-to-DC converter may include a primary converter, a secondary converter, and a DC-to-DC module. The DC-to-DC module may control the operation of the secondary converter based on a set-point threshold and a power output of the primary converter, where the set-point threshold may be variably set.

18 Claims, 7 Drawing Sheets

(56) References Cited

U.S. PATENT DOCUMENTS

2004/0201279 A1* 10/2004 Templeton .............. H02J 1/102
    307/11
2009/0212634 A1* 8/2009 Kojima ................ B60L 3/0023
    307/77

FOREIGN PATENT DOCUMENTS

| | | |
|---|---|---|
| EP | 2 096 745 | 9/2009 |
| WO | WO 02/063752 | 8/2002 |

* cited by examiner

| Operation Parameter | | | |
|---|---|---|---|
| Temperature | Voltage | Current | Set-Point |
| T1-T2 | V1-V2 | I1-I2 | SP1 |
| T3-T4 | V3-V4 | I3-I4 | SP2 |
| T5-T6 | V5-V6 | I5-I6 | SP3 |
| T7-T8 | V7-V8 | I7-I8 | SP4 |
| ⋮ | ⋮ | ⋮ | ⋮ |

DC-TO-DC CONVERTER WITH VARIABLE SET-POINT CONTROL

FIELD

The present disclosure relates to a DC-to-DC converter, and more particularly, a dual board converter having variable set-point control for a vehicle.

BACKGROUND

This section provides background information related to the present disclosure which is not necessarily prior art.

Vehicles, such as electric vehicles and/or hybrid vehicles, include a buck type DC-to-DC converter for converting high voltage from a battery to a low voltage. Such DC-to-DC converters provide electrical power to various electrical driven components in the vehicle.

As customer demand for increased electrical features increases, so does the electrical load placed on a vehicle system. Consequently, the DC-to-DC converter is required to support the vehicle system by outputting the necessary voltage and/or current for powering the electrical components. The typical DC-to-DC converter may simply output the voltage and/or current while the efficiency of the DC-to-DC converter and the vehicle system may only be a result. As an electrical system, the efficiency of vehicle is critical to the performance and fuel economy of the vehicle.

SUMMARY

This section provides a general summary of the disclosure, and is not a comprehensive disclosure of its full scope or all of its features.

A DC-to-DC converter for a vehicle may include a primary converter and a secondary converter. The primary converter and the secondary converter are electrically coupled to a power source of the vehicle, and both convert a first voltage from the power source to a second voltage lower than the first voltage.

The DC-to-DC converter may also include a DC-to-DC module that controls the operation of the secondary converter based on a set-point threshold and a power output of the primary converter. For example, the DC-to-DC module may activate the secondary converter when the power output of the primary converter is greater than or equal to the set-point threshold and deactivate the secondary converter when the power output of the primary converter is less than the set-point threshold.

The set-point threshold may be variably set. For example, in a feature of the disclosure, the DC-to-DC module may set the set-point threshold based on a desired set-point threshold transmitted by a device external of the vehicle.

In another feature of the disclosure, the set-point threshold may be adjusted based on an operation parameter of the primary converter and a correlation table.

In yet another feature of the disclosure, the set-point threshold may be adjusted based on performance history of the vehicle, the operation parameter, and/or the correlation table.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present disclosure will now be described more fully with reference to the accompanying drawings.

Figure 1:
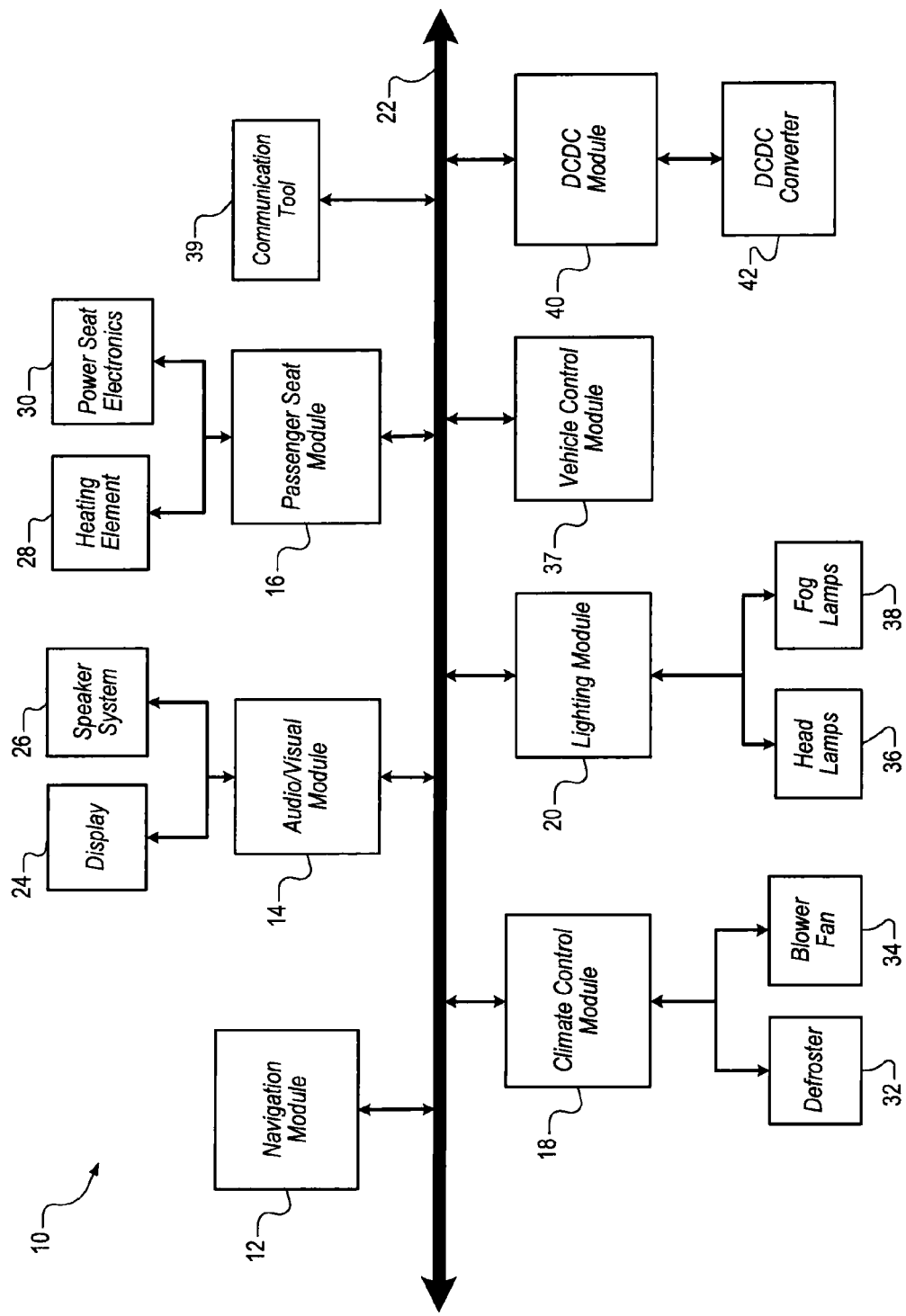
FIG. 1 is an example of a functional block diagram of a vehicle system.

With reference to FIG. 1, a vehicle system 10 is now presented. The vehicle system 10 may be for a hybrid vehicle and/or electric vehicle. The vehicle system 10 may include multiple control modules for controlling various components or devices in a vehicle. For example, the vehicle system 10 may include a navigation module 12, an audio-visual module 14, a passenger seat module 16, a climate control module 18, and a lighting module 20.

The navigation module 12 may provide information regarding a location of the vehicle from a GPS receiver. The navigation module 12 may provide such information to the audio-visual module 14 via a communication network 22. The communication network 22 may be a car area network (CAN), a local interconnect network (LIN), or other suitable vehicle communication networks.

The audio-visual module 14 may control, for example, a display 24 and a speaker system 26. The display 24 and the speaker system 26 are disposed within a passenger cabin of the vehicle. The vehicle may include more than one display 24. The display 24 may be a liquid crystal display (LCD). The speaker system 26 may include one or more speakers. The audio-visual module 14 controls the images being displayed by the display 24 and the sound being projected from the speaker system 26. For example, the audio-visual module 14 may control the display 24 to present the location of the vehicle on a map which is provided by the navigation module 12. The speaker system 26 may also emit navigation directions to a specified destination.

The passenger seat module 16 may control a driver seat and a front passenger seat. For example, vehicle seats may be equipped with a heating element 28 and power seat electronics 30. The heating element 28 may be embedded in the fabric of the seat for heating the seat. The power seat electronics 30 controls the position of the seat. For example, the power seat electronics 30 can adjusts the fore-and-aft position, seat height, lumbar position, and/or seat depth. The passenger seat module 16 may receive a signal from seat control switches which may activate the heated seat feature and/or adjusts the position of the seat. Based on the signal received, the passenger seat module 16 controls the heating element 28 and/or the power seat electronics 30.

The climate control module 18 controls the heat, ventilation, air-conditioning system (HVAC) of the vehicle. Various gauges may be used to adjust the environment in the passenger cabin. Based on the settings of the gauges, the climate control module 18 controls various components of the HVAC system. For example, the climate control module 18 may control a defroster 32 and a blower fan 34.

The lighting module 20 controls the exterior lighting of the vehicle. The lighting module 20 may turn on headlamps 36 and/or fog lamps 38. The lighting module 20 may automatically turn on exterior lights based on information from photosensors. The lighting module 20 may also control the exterior lights based on the settings of light gauges disposed in the passenger cabin.

The vehicle system 10 also includes a vehicle control module 37. The vehicle control module 37 monitors the various sub-systems within the vehicle system 10. Specifically, the vehicle control module 37 communicates with the other modules of the vehicle system 10 via the communication network 22. For example, the audio-visual module 14 may notify the vehicle control module 37 of the activation of the display 24 and the speaker system 26. Similarly, the climate control module 18 may notify the vehicle control module 37 of the performance of the HVAC system and the activation of its various components.

In addition to communicating with modules of the vehicle system 10 via the communication network 22, the vehicle control module 37 may communicate with devices external of the vehicle such as a communication tool 39 via the vehicle network. The communication tool 39 may be connectable and disconnectable to and from the communication network 22. The communication tool 39 transmits and receives information from the vehicle control module 37 via the communication network 22. It is readily understood that an external device such as the communication tool 39 may communicate with other modules disposed in the vehicle and is not limited to the vehicle control module 37.

A DC-to-DC (DCDC) module 40 controls a DC-to-DC (DCDC) converter 42. The DCDC converter 42 is a step down type power converter (i.e., a buck converter). More particularly, the DCDC converter 42 converts a source of direct current (DC) from one voltage level to a lower voltage level, as described in detail below.

Figure 2:
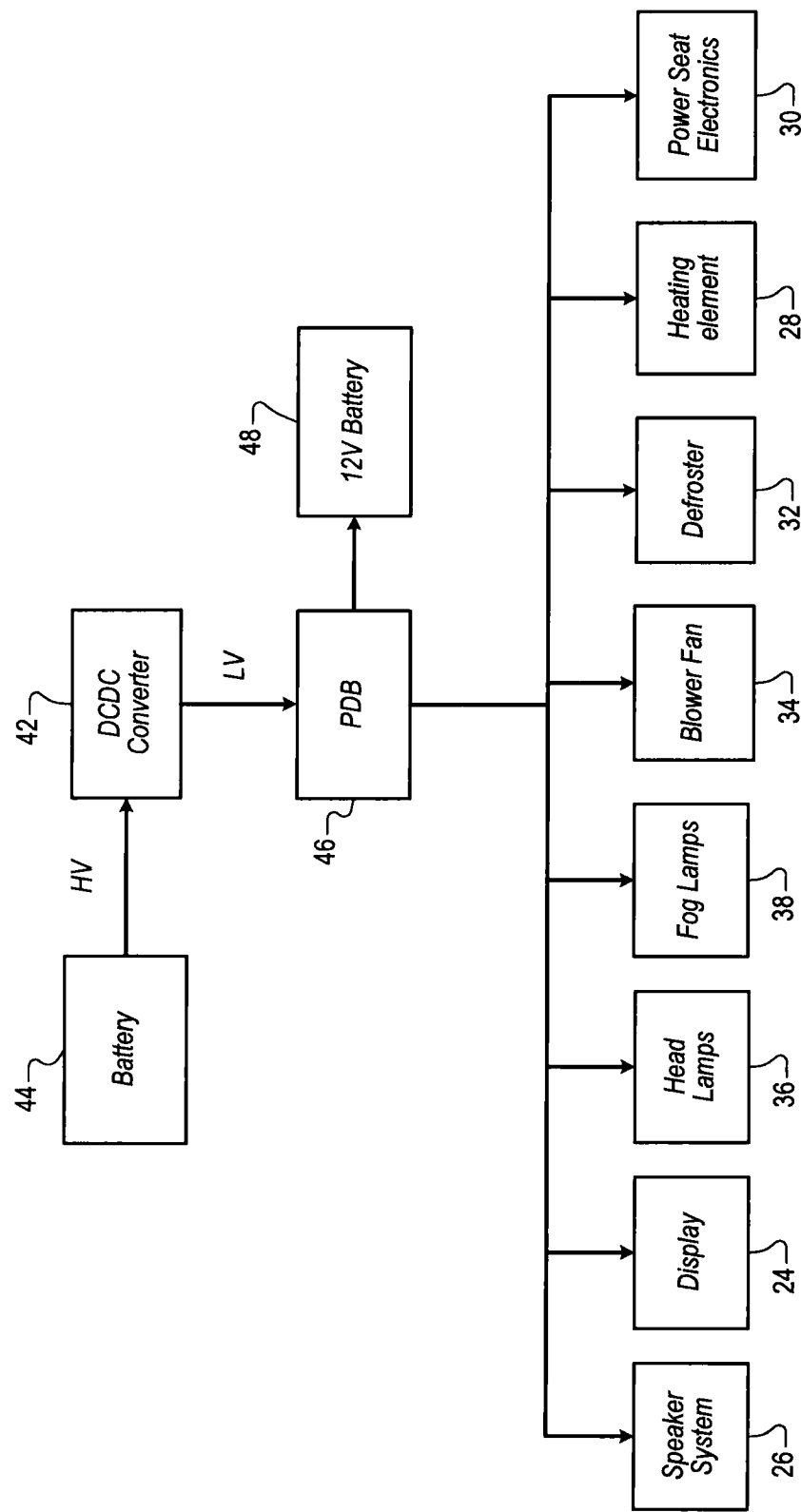
FIG. 2 is a block diagram of an electrical system for the vehicle system of FIG. 1.

The various components disposed within the vehicle may require electrical power in order to operate. With reference to FIG. 2, an example of an electrical system of the vehicle is presented. A battery 44 provides high voltage power to the vehicle. The battery 44 may power one or more electric motors (not shown). The electric motors may convert the electrical power from the battery 44 to mechanical power to move the vehicle.

The battery 44 may also be used to power components within the vehicle (vehicle components). More particularly, voltage from the battery 44 is distributed to the vehicle components via the DCDC converter 42 and a power distribution board (PDB) 46. The DCDC converter 42 converts the high voltage (HV) from the battery 44 to low voltage (LV). The low voltage is then supplied to the PDB 46.

The PDB 46 distributes the low voltage to other vehicle components. For example, as shown in FIG. 2, the PDB 46 is electrically coupled to a 12V battery 48, the speaker system 26, the display 24, the headlamps 36, the fog lamps 38, the blower fan 34, the defroster 32, the heating element 28, and the power seat electronics 30. The PDB 46 may be coupled to other power distribution boards and/or other vehicle components which may not be shown. For example, the PDB 46 may be electrically coupled to another power distribution board that powers electrical components of the HVAC system. Accordingly, the blower fan 34 and the defroster 32 may receive electrical power from the PDB 46 by way of the other power distribution board. While certain modules and components are depicted in FIGS. 1 and 2, it will be appreciated by one skilled in the art, that other modules and components may also be included in the vehicle system 10.

Figures 3, 5:
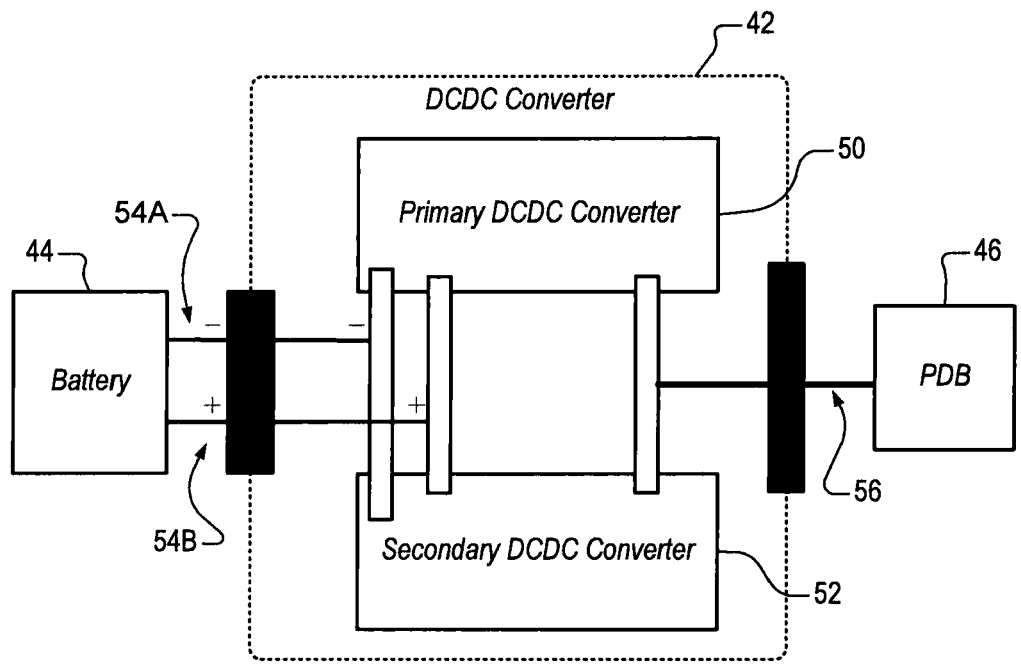
FIG. 3 illustrates an electrical connection between a DCDC converter, a battery, and a power distribution board of the vehicle system.
FIG. 5 is an example of a correlation table.

With reference to FIG. 3, an example of the DCDC converter 42 is presented. The DCDC converter 42 includes two DC-to-DC buck type converters. Specifically, the DCDC converter 42 includes a primary DCDC converter 50 and secondary DCDC converter 52. The primary DCDC converter 50 may be known as a master DCDC converter, and the secondary DCDC converter 52 may be known as a slave DCDC converter. For the sake of brevity, the primary DCDC converter 50 is referred to as the primary converter 50 and the secondary DCDC converter 52 is referred to as the secondary converter 52 in the following.

As DC-to-DC buck type converters, the primary converter 50 and the secondary converter 52 may be provided as an electric circuit disposed on a board. The primary converter 50 and the secondary converter 52 may be disposed together within, for example, one housing. Alternatively, the primary converter 50 and the secondary converter 52 may be disposed in separate housings.

In the example embodiment of FIG. 3, the primary converter 50 and the secondary converter 52 are both electrically coupled to the battery 44 and the PDB 46. As the DCDC converter 42, the primary converter 50 and the secondary converter 52 are electrically coupled to the battery 44, via a high voltage insular cable 54A, 54B. The high voltage insular cable 54A may couple a negative terminal of the battery 44 to a negative terminal of the DCDC converter 42 and the high voltage insular cable 54B may couple a positive terminal of the battery 44 to a positive terminal of the DCDC converter 42. The primary converter 50 and the secondary converter 52 are electrically coupled to the PDB 46 by way of a low voltage insular cable 56.

Figure 4:
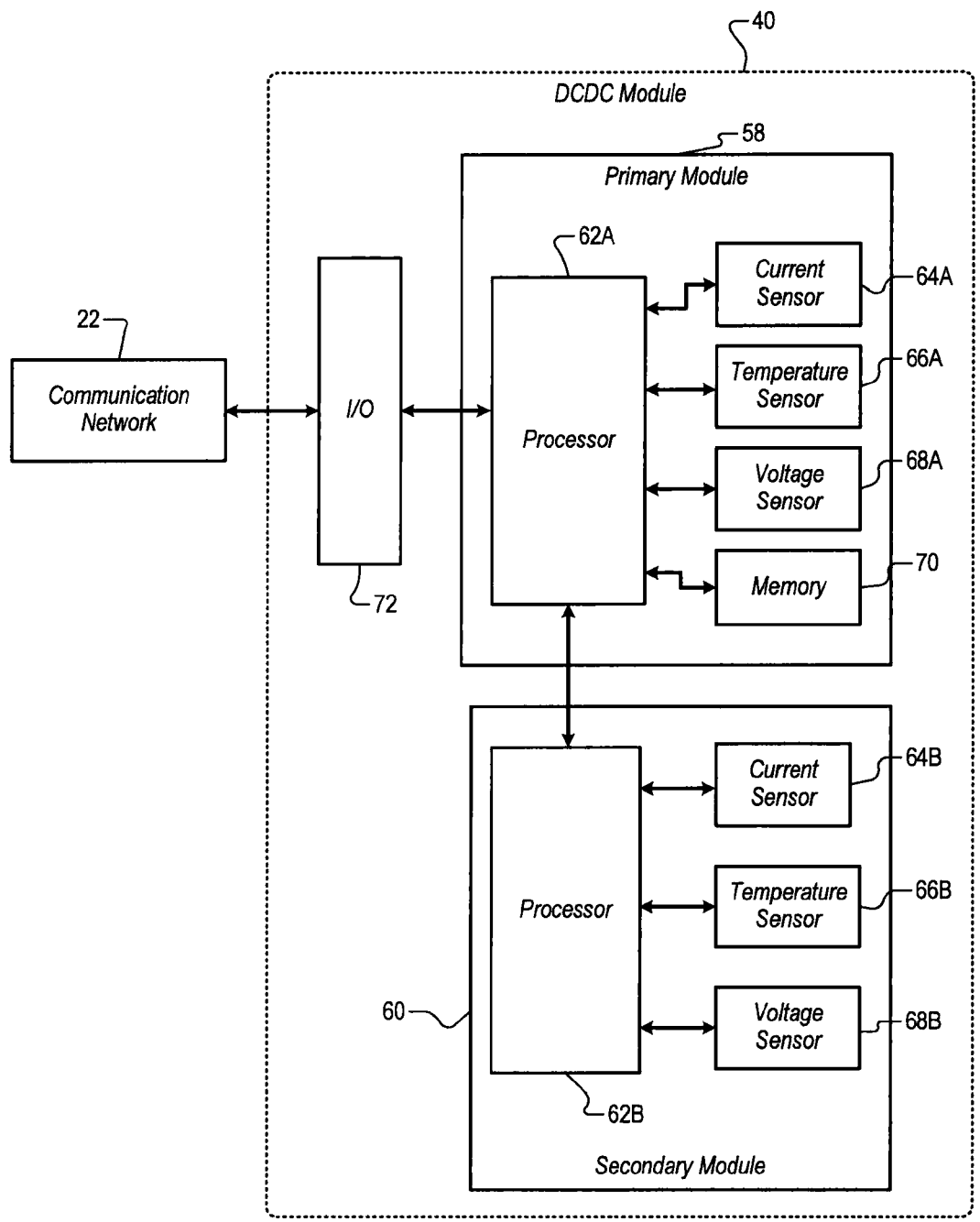
FIG. 4 is a block diagram of block diagram of a DCDC module of the vehicle system.

With reference to FIG. 4, an example of the DCDC module 40 is now presented. The DCDC module 40 includes a primary module 58 (i.e., master module) and a secondary module 60 (i.e., slave module). The primary module 58 is part of the primary converter 50, and the secondary module 60 is part of the secondary converter 52. The primary module 58 may be programmed to identify its converter as the "primary", and the secondary module 60 may be programmed to identify its converter as the "secondary".

The primary module 58 includes a processor 62A, a current sensor 64A, a temperature sensor 66A, and a voltage sensor 68A. Similarly, the secondary module 60 includes a processor 62B, a current sensor 64B, a temperature sensor 66B, and a voltage sensor 68B. The processor 62A of the primary module 58 is communicably coupled to the processor 62B of the secondary module 60. Accordingly, the primary module 58 and the secondary module 60 may exchange, for example, data operation instructions and other switchable information.

In the following description, components of the primary module 58 may be referenced with "primary" and components of the secondary module 60 may be referenced with "secondary". For example, the processor 62A may be referred to as the primary processor 62A, and the processor 62B may be referred to as the secondary processor 62B.

The primary current sensor 64A detects the amount of current being outputted by the primary converter 50 and communicates such information to the primary processor 62A. The primary temperature sensor 66A detects the temperature of the primary converter 50 and communicates such information to the primary processor 62A. The primary voltage sensor 68A detects the amount of voltage being outputted by the primary converter 50 and communicates such information to the primary processor 62A.

The secondary current sensor 64B, the secondary temperature sensor 66B, and the secondary voltage sensor 68B function in a similar manner as the primary current sensor 64A, the primary temperature sensor 66A and the primary voltage sensor 68A, respectively. The secondary current sensor 64B, the secondary temperature sensor 66B, and the secondary voltage sensor 68B communicate the information detected to the secondary processor 62B.

The primary module 58 may also include a memory 70. The memory 70 is communicatively coupled to the primary processor 62A. The memory 70 may store, for example, processes to be performed by the primary processor 62A. The memory 70 is a non-transitory computer readable medium.

The DCDC module 40 may also include an input/output interface 72. The primary module 58 may communicate with the communication network 22 via the I/O interface 72. In the example embodiment, the primary module 58 is communicatively coupled to the I/O interface 72. Alternatively, the secondary module 60 may also be communicatively coupled to the I/O interface 72.

In the example embodiment, the primary converter 50 and the secondary converter 52 perform in a similar manner. More particularly, when in operation, both the primary converter 50 and the secondary converter 52 convert a high voltage from the battery 44 to a lower voltage.

As the primary, the primary converter 50 is the lead converter for continuously supplying low voltage to the PDB 46. The primary module 58 monitors the performance of the primary converter 50. Specifically, the primary module 58 monitors the amount of voltage and/or current being outputted by the primary converter 50.

As the number of components that receive power from the PDB 46 increases, the load placed on the primary converter 50 also increases. To meet the electrical demands of the vehicle system 10, the secondary converter 52 is utilized to supplement the primary converter 50. More particularly, the secondary converter 52 is turned on when a power output of the primary converter 50 reaches a set-point threshold.

The power output of the primary converter 50 may be gauged by the amount of current and/or the amount of voltage the primary converter 50 is producing. The power output of the primary converter 50 is compared with the set-point threshold to determine whether the secondary converter 52 is to be activated/deactivated. For example, when the primary converter 50 outputs a current and/or a voltage above the set-point threshold, the primary module 58 may send a signal to the secondary module 60. The secondary module 60 may then turn on the secondary converter 52 which begins to convert high voltage to low voltage. Accordingly, during high electric loads, the vehicle system 10 utilizes both the primary converter 50 and the secondary converter 52.

As the primary converter 50 and the secondary converter 52 are in operation, the load placed on the DCDC converter 42 may begin to decrease. For example, vehicle components may be turned off and, therefore, no longer require power from the PDB 46. Accordingly, the primary module 58 may turn off the secondary converter 52. For example, when the current and/or voltage level outputted by the primary converter 50 is below the set-point threshold, the primary processor 62A transmits a signal to the secondary processor 62B to turn off the secondary converter 52. The primary converter 50 continues to provide power while the secondary converter 52 is in the off state.

The set-point threshold interchanges the DCDC converter 42 between a single DCDC converter (i.e., primary converter 50) and a dual DCDC converter (primary converter 50 and secondary converter 52). The set-point threshold may be a variable set-point. More particularly, the set-point threshold may be determined based on the efficiency of the DCDC converter 42 and the vehicle system 10.

In the example embodiment, the set-point threshold may be determined by the original equipment manufacturer (OEM) of the vehicle. The OEM may set the set-point threshold based on the efficiency and standards of the vehicle system 10. For example, after extensive testing, the OEM may determine at which current and/or voltage output level the DCDC converter 42 should switch from a single DCDC converter to a dual DCDC converter.

The OEM may set the set-point threshold via the communication tool 39. The communication tool 39 may communicate the set-point threshold (i.e., a desired set-point threshold) to the vehicle control module 37. The vehicle control module 37 transmits the set-point threshold to the DCDC module 40 via the communication network 22. For example, the primary processor 62B of the DCDC module 40 receives the set-point threshold and stores the set-point threshold in the memory 70. Once set, the DCDC module 40 utilizes the set-point threshold provided by the communication tool 37 for switching between the single DCDC converter and the dual DCDC converter. Accordingly, the OEM is able to set the set-point threshold based on the optimum efficiency of their vehicle system 10.

Once set, the set-point threshold is permanently fixed and may not change. As an alternative to the fixed set-point threshold determined by the OEM, the set-point threshold may be adjustable. For example, the primary module 58 may adjust the set-point threshold based on an operation parameter of the primary converter 50.

The operation parameter gauges the performance of the primary converter 50. For example, the operational parameter may be determined by an algorithm and/or detected by a sensor. In the example embodiment, the operation parameter is provided as the temperature, the voltage, and the current detected by the sensors 64A, 66A, and 68A.

Using a predefined correlation table 80, the primary module 58 may adjust the set-point threshold based on the operation parameter of the primary converter 50. With reference to FIG. 5, an example of the correlation table 80 is presented. The correlation table 80 may be stored in the memory 70. The correlation table 80 identifies a set-point threshold ("Set-Point" in FIG. 5) for specific temperature, voltage, and current ranges. As the temperature, current, and/or voltage of the primary converter 50 varies, the set-point threshold may be adjusted.

In the example embodiment, the primary module 58 may adjust the set-point threshold when any one of the operation parameters fluctuates. For example, if the temperature of the primary converter 50 changes from a value between the range T1-T2 to a value between the range T3-T4, the primary module 58 may adjust the set-point threshold to SP2. Accordingly, the set-point threshold may be adjusted per the change in temperature even if the voltage and the current of the primary converter 50 do not change. Alternatively, the primary module 58 may change the set-point threshold when, for example, two more of the operation parameters change. As such, it would be appreciated by one skilled in the art that the set-point threshold may be adjusted based on one or more operation parameters.

Furthermore, in the example embodiment, the set-point threshold is adjusted based on the temperature, the voltage, and/or current. Alternatively, the set-point threshold may be adjusted based on the voltage, and/or current, or only the voltage. In other words, the operation parameter used to adjust the set-point threshold may include one or more characteristics and is not limited to temperature, voltage, and current as described herein.

Furthermore, the operation parameter may be determined by a predefined algorithm that utilizes information detected by a sensor to determine the operation parameter. For example, the algorithm may weigh the temperature, the current, and/or voltage detected by the sensors 64A, 66A, and 68A to determine an overall operation parameter. A correlation table may then associate various levels of the overall operation parameter with a given set-point threshold.

By adjusting the set-point threshold, the DCDC converter 42 functions at optimal level. More particularly, as the load on the DCDC converter 42 fluctuates, the operation parameter also fluctuates. The DCDC module 40 adjusts the set-point threshold to meet the performance requirements of the vehicle system 10 while optimizing the efficiency of the DCDC converter 42.

To further optimize the efficiency of the DCDC converter 42, the DCDC module 40 may be a smart module by learning an operation pattern of vehicle system 10. For example, the DCDC module 40 may collect and store information regarding the performance of the DCDC converter 42 and the components of the vehicle system 10.

The DCDC module 40 via the primary module 58 may receive and/or request information regarding which vehicle components are receiving power from, for example, the vehicle control module 37. The DCDC module 40 may build a performance history of the vehicle system 10. For example, when the primary module 58 adjusts the set-point threshold, the primary module 58 may store the temperature, the voltage, and the current of the primary converter 50. In addition, the primary module 58 may also store information regarding the vehicle components that are receiving power and a time stamp indicating the time at which such information was stored. The primary module 58 may also store additional information, such as the temperature, the voltage, and the current of the secondary converter 52, whether the DCDC converter 42 is performing as single DCDC converter or a dual DCDC converter, and other suitable information.

As part of the DCDC module 40, the primary module 58 may store such information in the memory 70. The primary module 58 may store such information at the time the set-point threshold is adjusted. Alternatively, the primary module 58 may also store such information periodically or as the information changes.

In the example embodiment, the primary module 58, as part of the DCDC module 40, is referenced for adjusting the set-point threshold and storing performance history of the vehicle. Alternatively, the DCDC module 40 may include a system module separate from the primary module 58 and the secondary module 60. The system module may adjust and store information. It would be appreciated by one skilled in the art that the DCDC module 40 may be configured in various suitable ways for collecting information, and is not limited to the example described herein.

Using the predefined correlation table 80 as an initial set point and the information stored in the memory 70, the DCDC module 40 may detect a pattern between the vehicle components being used and the set-point threshold for a particular point in time. The DCDC module 40 may then adjust the set-point threshold based on the pattern detected. For example, at certain times during the day, the vehicle system 10 may be utilizing more vehicle components than at other times. For instance, in the morning a user may heat the seats and turn on the defroster and blower fans to warm the vehicle during the winter months. Whereas, in the afternoon, a user may not heat the seats and/or turn on the defroster and blower fan.

Accordingly, the DCDC module 40 may adjust the set-point threshold to a suitable level to meet expected performance requirement of the vehicle system 10. More particularly, the set-point threshold is set to a suitable level based on the performance history of the vehicle. Thus, the pattern learned by the DCDC module 40, may alter the set-point threshold to further optimize the efficiency of the system.

Figure 6:
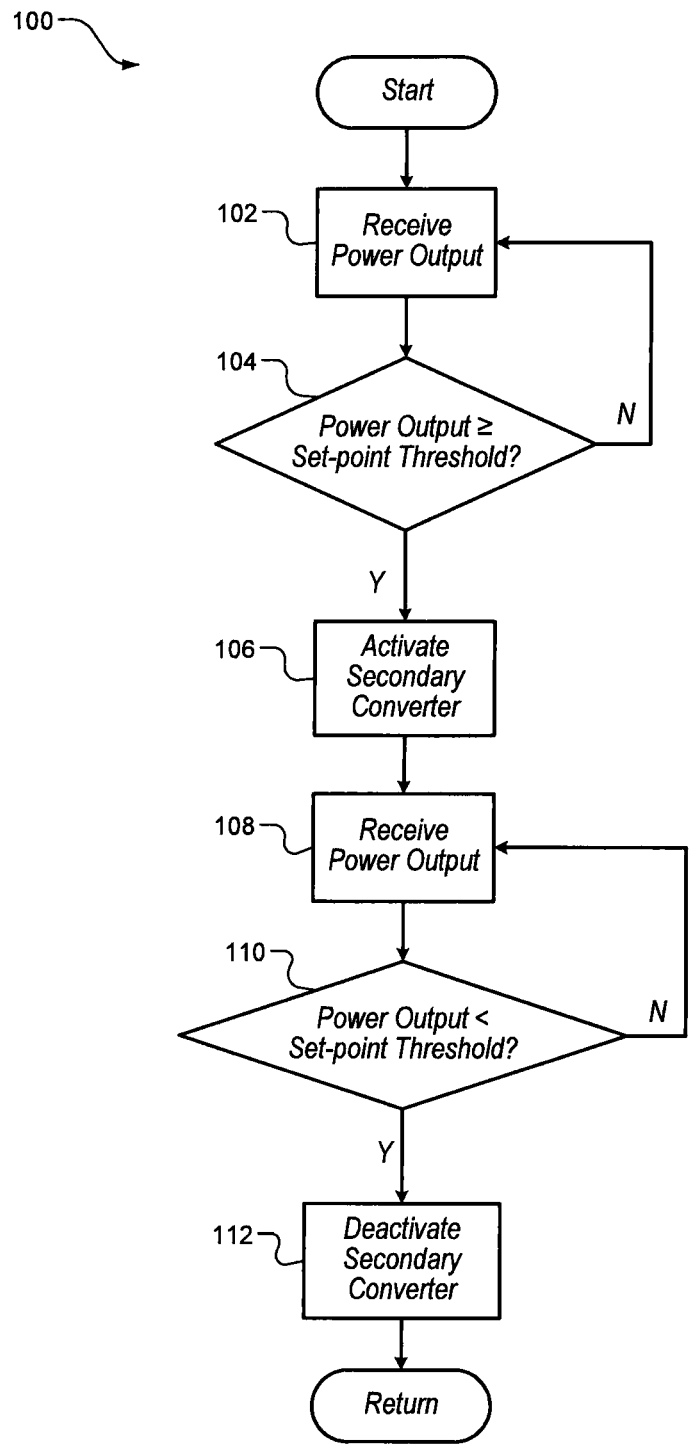
FIG. 6 is a flow chart of an example method for switching the DCDC converter between a single converter and a dual converter.

With reference to FIG. 6, a flow chart of an example method 100 for switching the DCDC converter 42 between the single converter and the dual converter is now presented. At 102 the DCDC module 40 receives power output information from the sensors disposed at the primary converter 50. For example, the DCDC module 40 may receive a voltage and/or the current being outputted by the primary converter 50 from the voltage sensor 68A and/or current sensor 64A.

The DCDC module 40 may then determine whether the power output of the primary converter 50 is greater than or equal to the set-point threshold at 104. If the power output is not greater than or equal to the set-point threshold, the control returns to 102. If the power output is determined as greater than or equal to the set-point threshold, the DCDC module 40 activates the secondary converter 52 at 106. For example, the primary module 58 may transmit a signal to the secondary module 60 which in response, turns on the secondary converter 52.

At 108, the DCDC module 40 receives the power output of the primary converter 50. At 110, the DCDC module 40 determines whether the power output is less than the set-point threshold. If the power output is not less than the set-point threshold, the control returns to 108. If the power output is less than the set-point threshold, the DCDC module 40 deactivates the secondary converter 52 at 112. For example, the primary module 58 may transmit a signal to the secondary module 60 which in response turns off the secondary converter 52. After the deactivation of the secondary converter 52 at 112, the DCDC module 40 returns to the beginning of the process and continues to monitor the power output of the primary converter 50.

Figure 7:
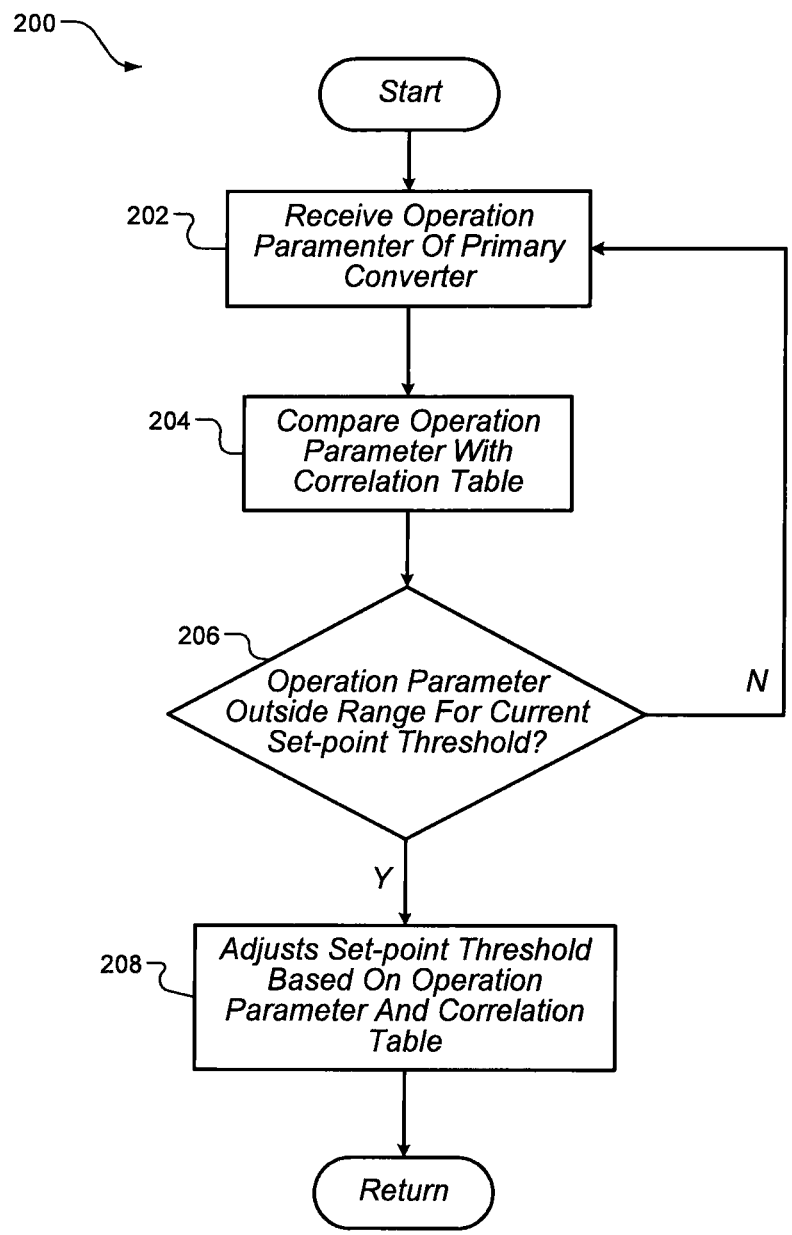
FIG. 7 is a flow chart of an example method for adjusting a set-point threshold based on an operation parameter of the primary converter and the correlation table.

With reference to FIG. 7, a flow chart of an example method 200 for adjusting the set-point threshold based on the operation parameter of the primary converter 50 is now presented. The DCDC module 40 may perform the method 200 and the method 100 at the same time. At 202 the DCDC module 40 receives information regarding the operation parameter of the primary converter 50 from the sensors. For example, the DCDC module 40 may receive information from the current sensor 64A, temperature sensor 66A, and/or voltage sensor 68A, as the operation parameter.

The DCDC module 40 compares the operation parameter with the correlation table stored in the memory 70 at 204. The DCDC module 40 may then, at 206, determine whether the operation parameter received is outside its range for the current set-point threshold. For example, the DCDC module 40 may compare values received, such as temperature, voltage, and/or current with the ranges provided in the correlation table. The DCDC module 40 may then determine whether one of the values is outside its range for the current set-point threshold.

If the values received are not outside their respective range for the current set-point threshold, the DCDC module 40 returns to 202. When one of the values is outside its range for the current set-point threshold, the DCDC module 40 adjusts the set-point threshold based on the operation parameter and the correlation table at 208. Accordingly, the DCDC module 40 changes the set-point threshold based on the performance of the primary converter 50. After 208, the DCDC module 40 returns to 202.

Figure 8:
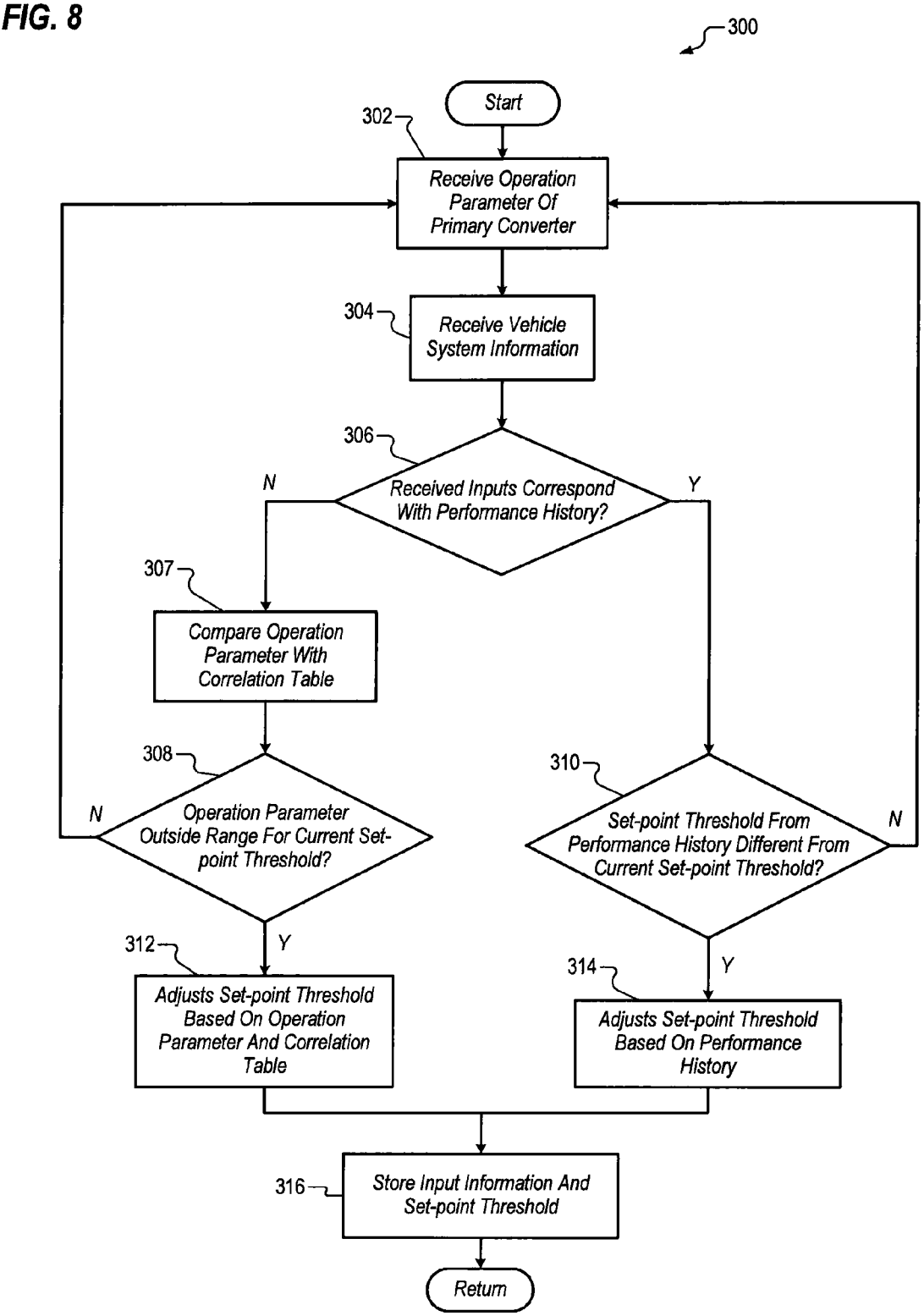
FIG. 8 is a flow chart of an example method for adjusting the set-point threshold based on a performance history of the vehicle system.

With reference to FIG. 8, the flow chart of an example method 300 for adjusting the set-point threshold based on a performance history of the vehicle system 10 is now presented. The DCDC module 40 may perform the method 100 and the method 300 at the same time. At 302 the DCDC module 40 receives the operation parameter of the primary converter 50. Furthermore, the DCDC module 40 at 304 receives vehicle system information from the vehicle control module 37. For example, the DCDC module 40 may receive information regarding vehicle components within the vehicle system 10 which are receiving power from the PDB 46 as the vehicle system information.

The DCDC module 40 determines whether the inputs received correspond with the performance history of the DCDC converter 42 at 306. For example, the DCDC module 40 may determine whether the performance history stored in the memory 70 matches the inputs provided from the primary converter 50 and the vehicle control module 37.

When the inputs received do not correspond with the performance history, the DCDC module 40 continues to 308. On the other hand, when the inputs received correspond with the performance history, the DCDC module 40 continues to 310.

At 307, the DCDC module 40 compares the operation parameter with the correlation table, and, at 308, determines whether the operation parameter is outside the range for the current set-point threshold per the correlation table. If the operation parameter is not outside the range for the current set-point threshold, the DCDC module 40 returns to 302. On the other hand, if the operation parameter is outside the range for the current set-point threshold, the DCDC module 40 adjusts the set-point threshold based on the operation parameter received and the correlation table at 312.

At 310, the DCDC module 40 determines whether the set-point threshold from the performance history is different from the current set-point threshold. If the set-point threshold from the performance history is not different from the current set-point threshold, the DCDC module 40 returns to 302. On the other hand, if the set-point threshold from the performance history is different from the current set-point threshold, the DCDC module 40 at 314 adjusts the set-point threshold based on the performance history. In other words, the DCDC module 40 may adjust the set-point threshold to the one provided in the performance history.

From either 312 or 314, the DCDC module 40 stores the input received and the set-point threshold at 316. The DCDC module 40 returns to the beginning of the process at 302.

In this application, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, operations, and/or components, but do not preclude the presence or addition of one or more other features, operations, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A DC-to-DC converter for a vehicle, the DC-to-DC converter comprising:
    a primary converter electrically coupled to a power source of the vehicle, the primary converter converting a first voltage from the power source to a second voltage lower than the first voltage;
    a secondary converter electrically coupled to the power source, the secondary converter converting the first voltage from the power source to the second voltage; and
    a DC-to-DC module controlling the secondary converter based on a set-point threshold and a power output of the primary converter, wherein the set-point threshold is variably set, and the DC-to-DC module activates the secondary converter when the power output of the primary converter is greater than or equal to the set-point threshold and deactivates the secondary converter when the power output of the primary converter is less than the set-point threshold.

2. The DC-to-DC converter of claim 1 wherein the DC-to-DC module sets the set-point threshold based on a desired set-point threshold transmitted by a device external of the vehicle.

3. The DC-to-DC converter of claim 1 wherein
    the DC-to-DC module includes a correlation table, the correlation table associates a plurality of values for an operation parameter of the primary converter with a given set-point threshold, and
    the DC-to-DC module adjusts the set-point threshold to the given set-point threshold based on a present value of the operation parameter of the primary converter and the set-point correlation table.

4. The DC-to-DC converter of claim 3 further comprising:
    a temperature sensor detecting a temperature of the primary converter;
    a voltage sensor detecting a voltage amount generated by the primary converter; and
    a current sensor detecting a current amount generated by the primary converter, wherein
    the operation parameter includes the temperature, the voltage amount, and the current amount, and the DC-to-DC module adjusts the set-point threshold to the given set-point threshold based on a present value of the temperature, the voltage amount, and the current amount.

5. The DC-to-DC converter of claim 1 wherein the power output is measured as an amount of current that is outputted by the primary converter.

6. The DC-to-DC converter of claim 1 wherein the power output is measured as an amount of voltage that is outputted by the primary converter.

7. A DC-to-DC converter electrically coupled to a power source of a vehicle and a plurality of components disposed in the vehicle, the DC-to-DC converter converting a first voltage from the power source to a second voltage less than the first voltage, the DC-to-DC converter comprising:
    two converters; and
    a DC-to-DC module controlling the two converters based on a set-point threshold, the DC-to-DC module including a correlation table, wherein the correlation table associates a plurality of values of an operation parameter for a first converter with a given set-point threshold, the DC-to-DC module adjusts the set-point threshold to the given set-point threshold based on a present value of the operation parameter of the first converter and the correlation table, and the first converter is one of the two converters.

8. The DC-to-DC converter of claim 7 wherein
    the DC-to-DC module monitors a power output of the first converter,
    the DC-to-DC module operates the first converter when the power output of the first converter is less than the set-point threshold, and
    the DC-to-DC module operates the first converter and a second converter that is the other one of the two converters when the power output of the first converter is greater than or equal to the set-point threshold.

9. The DC-to-DC converter of claim 8 wherein the power output is an amount of current that is outputted by the first converter.

10. The DC-to-DC converter of claim 8 wherein the power output is an amount of voltage that is outputted by the first converter.

11. The DC-to-DC converter of claim 7 wherein the correlation table correlates a plurality of the operation parameters, each having the plurality of values, to the given set-point threshold.

12. The DC-to-DC converter of claim 11 wherein the plurality of the operation parameters include a temperature, a current, and a voltage of the first converter.

13. The DC-to-DC converter of claim 7 further comprising:
    a temperature sensor detecting a temperature of the first converter;
    a voltage sensor detecting a voltage amount generated by the first converter; and
    a current sensor detecting a current amount generated by the first converter, wherein
    the operation parameter includes the temperature, the voltage amount, and the current amount, and the DC-to-DC module adjusts the set-point threshold to the given set-point threshold based on a present value of the temperature, the voltage amount, and the current amount.

14. The DC-to-DC converter of claim 7 wherein
    the DC-to-DC module is in communication with a vehicle control module of the vehicle and receives information from the vehicle control module regarding a power state of the plurality of components receiving power, and
    the DC-to-DC module stores the set-point threshold, the present value of the operation parameter, and the information regarding the power state of the plurality of components receiving power in a computer readable medium when the set-point threshold is adjusted.

15. A vehicle system comprising:
a power source outputting a first voltage;
a power distribution board electrically coupled to a plurality of vehicle components and providing a second voltage lower than the first voltage to the plurality of vehicle components;
a DC-to-DC converter electrically coupled to the power source and the power distribution board, the DC-to-DC converter converting the first voltage from the power source to the second voltage and supplying the second voltage to the power distribution board, the DC-to-DC converter including:
a primary converter,
a secondary converter, and
a DC-to-DC module controlling the DC-to-DC converter as a single board converter and a dual board converter based on a set-point threshold, wherein as the single board converter, the primary converter converts the first voltage to the second voltage, and, as the dual board converter, the primary converter and the secondary converter convert the first voltage to the second voltage, and the DC-to-DC module monitors an operation parameter of the primary converter that indicates a performance level of the primary converter; and
a vehicle control module communicably coupled to the DC-to-DC module, wherein the vehicle control module notifies the DC-to-DC module of a power state of the plurality of vehicle components, wherein
the DC-to-DC module stores the power state of the plurality of the vehicle components as performance history in a computer readable medium, and
the DC-to-DC module adjusts the set-point threshold based on present power states of the plurality of vehicle components, a present value of the operation parameter and the performance history.

16. The vehicle system of claim 15 wherein the DC-to-DC module adjusts the set-point threshold to a recorded set-point threshold stored in the performance history when the present power state of the plurality of vehicle components correlates with the power states stored in the performance history.

17. The vehicle system of claim 15 wherein
the DC-to-DC module compares the present value of the operation parameter with a correlation table, the correlation table associates a plurality of values of the operation parameters with a given set-point threshold,
the DC-to-DC module adjusts the set-point threshold to a recorded set-point threshold stored in the performance history when the present power state of the plurality of vehicle components correlates with the power states stored in the performance history, and
the DC-to-DC module adjusts the set-point threshold based on the present value of the operation parameter and the correlation table when the present power state of the plurality of vehicle components does not correlate with the power states stored in the performance history.

18. The vehicle system of claim 15 wherein
the DC-to-DC module monitors a power output of the primary converter,
the DC-to-DC module operates the DC-to-DC converter as the single board converter when the power output of the primary converter is less than the set-point threshold, and
the DC-to-DC module operates the DC-to-DC converter as the dual board converter when the power output of the primary converter is greater than or equal to the set-point threshold.

* * * * *